United States Patent
Farrugia et al.

(10) Patent No.: US 8,163,459 B2
(45) Date of Patent: Apr. 24, 2012

(54) BIO-BASED AMORPHOUS POLYESTER RESINS FOR EMULSION AGGREGATION TONERS

(75) Inventors: Valerie M. Farrugia, Oakville (CA); Guerino Sacripante, Oakville (CA); Ke Zhou, Oakville (CA); Edward G. Zwartz, Mississauga (CA); Michael S. Hawkins, Cambridge (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/714,677

(22) Filed: Mar. 1, 2010

(65) Prior Publication Data

US 2011/0212396 A1    Sep. 1, 2011

(51) Int. Cl.
  G03G 9/087   (2006.01)
  C08J 9/00    (2006.01)
(52) U.S. Cl. ..................... 430/137.14; 525/18
(58) Field of Classification Search .......... 525/18; 430/137.14
  See application file for complete search history.

(56) References Cited

U.S. PATENT DOCUMENTS

| | | |
|---|---|---|
| 5,278,020 A | 1/1994 | Grushkin |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,959,066 A | 9/1999 | Charbonneau et al. |
| 5,973,173 A * | 10/1999 | Josten et al. .............. 554/207 |
| 5,977,210 A | 11/1999 | Patel et al. |
| 6,576,389 B2 | 6/2003 | Vanbesien et al. |
| 6,617,092 B1 | 9/2003 | Patel et al. |
| 6,627,373 B1 | 9/2003 | Patel et al. |
| 6,638,677 B2 | 10/2003 | Patel et al. |
| 6,656,657 B2 | 12/2003 | Patel et al. |
| 6,656,658 B2 | 12/2003 | Patel et al. |
| 6,664,017 B1 | 12/2003 | Patel et al. |
| 6,673,505 B2 | 1/2004 | Jiang et al. |
| 6,730,450 B1 | 5/2004 | Moffat et al. |
| 6,743,559 B2 | 6/2004 | Combes et al. |
| 6,756,176 B2 | 6/2004 | Stegamat et al. |
| 6,780,500 B2 | 8/2004 | Dumouchel |
| 6,818,730 B2 | 11/2004 | Brandenburg et al. |
| 6,830,860 B2 | 12/2004 | Sacripante et al. |
| 6,906,164 B2 * | 6/2005 | DeBruin .............. 528/308.1 |
| 7,029,817 B2 | 4/2006 | Robinson et al. |
| 7,144,632 B2 * | 12/2006 | Hayes ................ 428/423.7 |
| 7,223,567 B2 * | 5/2007 | Ka-Yiu et al. ........... 435/71.2 |
| 2002/0115817 A1 * | 8/2002 | Hayes .................. 528/295.3 |
| 2008/0107989 A1 | 5/2008 | Sacripante et al. |
| 2011/0003243 A1 | 1/2011 | Sacripante et al. |

FOREIGN PATENT DOCUMENTS

| | | |
|---|---|---|
| EP | 2 325 229 A1 | 5/2011 |
| GB | 1442835 | 7/1976 |
| JP | A-2006-96845 | 4/2006 |
| WO | WO 2005/059004 A1 | 6/2005 |
| WO | WO 2006/102280 A1 | 9/2006 |
| WO | WO 2008/031592 A1 | 3/2008 |

OTHER PUBLICATIONS

Fléche et al., "Isosorbide Preparation, Properties and Chemistry," Starch/Stärke, vol. 38, pp. 26-30, 1986.
Ballauf et al., "Polyesters (Derived from Renewable Resources)," Polymeric Materials Encyclopedia, vol. 8, pp. 5891-5896, 1996.
Lockwood, "Production of Organic Acids by Fermentation," Microbial Technology, $2^{nd}$ Ed., vol. 1, pp. 356-387, 1979.
Hockett et al., "Hexitol Anhydrides. The Structure of Isosorbide, A Crystalline Dianhydrosorbitol," J. Am. Chem. Soc., vol. 68, No. 6, pp. 927-930, 1946.
http://www.cyberlipid.org/cyberlip/oxid0001.htm, "Lipid Peroxidation," Feb. 26, 2010.
Jun. 20, 2011 Search Report issued in British Patent Application No. GB1103171.3.

* cited by examiner

*Primary Examiner* — Hoa V Le
(74) *Attorney, Agent, or Firm* — Oliff & Berridge, PLC

(57) ABSTRACT

Disclosed are amorphous polyesters that contain only renewable resources designed for emulsion aggregation toner fabrication. The amorphous polyesters may be obtained from the mixture of three different monomers: 1,4:3,6-dianhydro-D-sorbitol (isosorbide), nonanedioic acid (azelaic acid), and butanedioic acid (succinic acid). Different polymer properties may be achieved depending on the ratio of these three monomers. By altering the ratio, polymers of high to low acid value can be obtained, as well as different ranges of glass transition temperatures.

10 Claims, No Drawings

BIO-BASED AMORPHOUS POLYESTER RESINS FOR EMULSION AGGREGATION TONERS

TECHNICAL FIELD

This disclosure is directed to bio-based amorphous polyester resins that may be used to produce emulsion aggregation toners, and emulsion aggregation toners comprising the bio-based amorphous polyester resins.

BACKGROUND

Emulsion aggregation (EA) toners are used in forming print and/or xerographic images. Emulsion aggregation techniques typically involve the formation of an emulsion latex of resin particles that have a small size of from, for example, about 5 to about 500 nanometers in diameter, by heating the resin, optionally with solvent if needed, in water, or by making a latex in water using an emulsion polymerization. An optional colorant dispersion, for example of a pigment dispersed in water, optionally with additional resin, is separately formed. The colorant dispersion is added to the emulsion latex mixture, and an aggregating agent or complexing agent is then added and/or aggregation is otherwise initiated to form aggregated toner particles. The aggregated toner particles are heated to enable coalescence/fusing, thereby achieving aggregated, fused toner particles. United States patent documents describing emulsion aggregation toners include, for example, U.S. Pat. Nos. 5,278,020; 5,290,654; 5,308,734; 5,344,738; 5,346,797; 5,348,832; 5,364,729; 5,366,841; 5,370,963; 5,403,693; 5,405,728; 5,418,108; 5,496,676; 5,501,935; 5,527,658; 5,585,215; 5,650,255; 5,650,256; 5,723,253; 5,744,520; 5,747,215; 5,763,133; 5,766,818; 5,804,349; 5,827,633; 5,840,462; 5,853,944; 5,863,698; 5,869,215; 5,902,710; 5,910,387; 5,916,725; 5,919,595; 5,925,488; 5,977,210; 6,576,389; 6,617,092; 6,627,373; 6,638,677; 6,656,657; 6,656,658; 6,664,017; 6,673,505; 6,730,450; 6,743,559; 6,756,176; 6,780,500; 6,830,860; and 7,029,817; and U.S. Patent Application Publication No. 2008/0107989.

The disclosures of each of the foregoing patents and publications are hereby incorporated by reference herein in their entireties. The appropriate components and process aspects of each of the foregoing patents and publications may also be selected for the present compositions and processes in embodiments thereof.

SUMMARY

Energy and environmental policies, increasing and volatile oil prices, and public/political awareness of the rapid depletion of global fossil reserves has created a need to find sustainable monomers derived from biomaterials. By using bio-renewable feedstock, manufacturers may reduce their carbon footprint and move to a zero-carbon or even a carbon-neutral footprint. Bio-based polymers are also very attractive in terms of specific energy and emission savings. Utilizing bio-based feedstock can decrease the amount of plastic targeted for landfills, help provide new sources of income for domestic agriculture, and reduce the economic risks and uncertainty associated with reliance on petroleum imported from unstable regions.

Disclosed herein are amorphous polyesters designed for EA toner fabrication that contain only renewable resources. Specifically, the amorphous polyesters may be obtained from the mixture of three different monomers: 1,4:3,6-dianhydro-D-sorbitol (isosorbide), nonanedioic acid (azelaic acid), and butanedioic acid (succinic acid). Different polymer properties may be achieved depending on the ratio of these three monomers. By altering the ratio, polymers of high to low acid value can be obtained, as well as different ranges of glass transition temperatures.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Resins and Polymers

Polyesters may be obtained by the polycondensation of a diol and a diacid. The amorphous polyesters disclosed herein are the products of diols and diacids that are readily obtainable from renewable sources.

The diol is 1,4:3,6-dianhydro-D-sorbitol, referred to as isosorbide. The structural formula for isosorbide is:

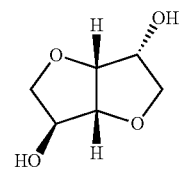

Isosorbide is readily made from renewable resources, such as sugars and starches, including corn starch. For example, isosorbide may be made by a multistep process that includes (1) hydrolyzing starch to form D-glucose, (2) hydrogenating D-glucose to form sorbitol, and (3) performing acid-catalyzed dehydration of the sorbitol to form isosorbitol. The preparation of isosorbide is known within the literature in, for example, Fleche et al., Starch/Starke, 38(1), pp. 26-30 (1986) and Ballauff et al., Polyesters (Derived from Renewable Sources), Polymeric Materials Encyclopedia, Vol. 8, p. 5892 (1996), the disclosures of which are hereby incorporated by reference herein in their entireties.

The two diacids used in the polyester formulation are succinic acid and azelaic acid. Succinic acid has the following structure:

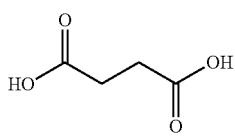

and is produced by a bioroute together with oxalic acid, fumaric acid, and malic acid in submerged culture anaerobic fermentation by various types of bacteria and molds. This production process is described by Lockwood, L. B., "Production of Organic Acids by Fermentation," In Microbial Technology, Peppier, H. J. and Perlman, D. Eds., Academic Press: New York, pp. 356-387 (1979), the entire disclosure of which is incorporated by reference herein.

Azelaic acid is produced by a chemical synthesis pathway from oleic acid. Oleic acid is a monosaturated 18-carbon fatty acid that is found in most animal fats and vegetable oils. Azelaic acid may be produced by oxidative cleavage of oleic acid with chromic acid or by Ozonolysis. Ozonolysis is disclosed in Cyberlipid, 2009 at www.cyberlipid.org/cyberlip/home0001.htm, the entire disclosure of which is incorporated by reference herein. Azelaic acid has the following structure:

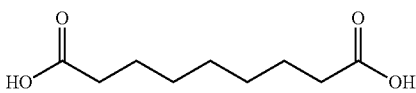

The polyester resin may be formed by the polycondensation of isosorbide with either succinic acid or azelaic acid, or a mixture of succinic acid and azelaic acid in the presence of a catalyst. The isosorbide may be selected in an amount of, for example, from about 40 to about 60 mol %, such as from about 42 to about 55 mol %, or from about 45 to about 53 mol % of the polyester resin. The total amount of diacid may be selected in an amount of, for example, from about 40 to about 60 mol %, such as from about 42 to about 55 mol %, or from about 45 to about 53 mol % of the polyester resin. When the diacid is a combination of succinic acid and azelaic acid, the amount of succinic acid may be selected in an amount of, for example, from about 30 to about 60 mol % of the polyester resin, and the amount of azelaic acid may be selected in an amount of, for example, from greater than 0 to about 20 mol % of the polyester resin.

Polycondensation catalysts include tetraalkyl titanates such as titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide; aluminum alkoxides; alkyl zinc; dialkyl zinc; zinc oxide; stannous oxide; and combinations thereof. The catalysts may be used in amounts of, for example, from about 0.001 mol % to about 0.55 mol % based on the starting diacid or diester used to generate the polyester resin.

The polyester resin may be present, for example, in an amount of from about 5 to about 50 wt % of the toner components, such as, for example, from about 10 to about 35 wt % of the toner components. The polyester resin may have a number average molecular weight ($M_n$), as measured by gel permeation chromatography (GPC) of, for example, from about 1,000 to about 50,000, such as from about 2,000 to about 25,000, and a weight average molecular weight ($M_w$) of, for example, from about 2,000 to about 100,000, such as from about 3,000 to about 14,000, as determined by GPC using polystyrene standards. The molecular weight distribution ($M_w/M_n$) of the polyester resin may be, for example, from about 1 to about 6, such as from about 1.5 to about 4.

The polyester resin may have a glass transition temperature (Tg) of, for example, from about 30° C. to about 120° C., such as from about 40° C. to about 90° C., or from about 45° C. to about 75° C. Adding more azelaic acid relative to the amount of succinic acid in the polymer formulation will decreases the glass transition temperature of the resin.

The polyester resin may have a softening point (Ts) of, for example, from about 90° C. to about 150° C., such as from about 95° C. to about 135° C., or from about 100° C. to about 120° C. Different softening points may produce toners exhibiting different gloss levels. For example, in some embodiments, resins having a softening point of 101° C. to 103° C. produce toners having a higher gloss than toners produced with resins having a softening point of 105° C. or higher.

The polyester resin may have an acid value from about 2 to about 30 mgKOH/g, such as from about 9 to about 16 mgKOH/g, or from about 10 to about 14 mgKOH/g. The acid value (or "neutralization number" or "acid number" or "acidity") may be measured by dissolving a known amount of polymer sample in an organic solvent and titrating with a solution of potassium hydroxide (KOH) with known concentration and with phenolphthalein as a color indicator. The acid number is the mass of potassium hydroxide in milligrams that is required to neutralize one gram of chemical substance. For the polyester resins, the acid number is the measure of the amount of carboxylic acid groups in a polyester molecule.

Surfactants

Colorants, waxes, and other additives used to form toner compositions may be in dispersions that include surfactants. Moreover, toner particles may be formed by emulsion aggregation methods where the resin and other components of the toner are placed in contact with one or more surfactants, an emulsion is formed, toner particles are aggregated, coalesced, optionally washed and dried, and recovered.

One, two, or more surfactants may be used. The surfactants may be selected from ionic surfactants and nonionic surfactants. Anionic surfactants and cationic surfactants are encompassed by the term "ionic surfactants." The surfactant may be present in an amount of from about 0.01 to about 5 wt % of the toner composition, such as from about 0.75 to about 4 wt % weight of the toner composition, or from about 1 to about 3 wt % of the toner composition.

Examples of suitable nonionic surfactants include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108.

Suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be used.

Examples of cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, cetyl pyridinium bromide, benzalkonium chloride, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Waxes

The resin emulsion may be prepared to include a wax. In these embodiments, the emulsion will include resin and wax particles at the desired loading levels, which allows for a single resin and wax emulsion to be made rather than separate resin and wax emulsions. Further, the combined emulsion allows for reduction in the amount of surfactant needed to prepare separate emulsions for incorporation into toner compositions. This is particularly helpful in instances where it would otherwise be difficult to incorporate the wax into the emulsion. However, the wax can also be separately emulsified, such as with a resin, and separately incorporated into final products.

In addition to the polymer binder resin, the toners may also contain a wax, either a single type of wax or a mixture of two or more preferably different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes may be added to provide multiple properties to the toner composition.

Examples of suitable waxes include waxes selected from natural vegetable waxes, natural animal waxes, mineral waxes, synthetic waxes, and functionalized waxes. Natural vegetable waxes include, for example, carnauba wax, candelilla wax, rice wax, sumacs wax, jojoba oil, Japan wax, and bayberry wax. Examples of natural animal waxes include, for example, beeswax, punic wax, lanolin, lac wax, shellac wax, and spermaceti wax. Mineral-based waxes include, for example, paraffin wax, microcrystalline wax, montan wax, ozokerite wax, ceresin wax, petrolatum wax, and petroleum wax. Synthetic waxes include, for example, Fischer-Tropsch wax; acrylate wax; fatty acid amide wax; silicone wax; polytetrafluoroethylene wax; polyethylene wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, diglyceryl distearate, dipropyleneglycol distearate, and triglyceryl tetrastearate; sorbitan higher fatty acid ester waxes, such as sorbitan monostearate; and cholesterol higher fatty acid ester waxes, such as cholesteryl stearate; polypropylene wax; and mixtures thereof.

In some embodiments, the wax may be selected from polypropylenes and polyethylenes commercially available from Allied Chemical and Baker Petrolite (for example POLYWAX™ polyethylene waxes from Baker Petrolite), wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes usually possess a molecular weight (Mw) of from about 500 to about 2,000, such as from about 1,000 to about 1,500, while the commercially available polypropylenes used have a molecular weight of from about 1,000 to about 10,000. Examples of functionalized waxes include amines, amides, imides, esters, quaternary amines, carboxylic acids or acrylic polymer emulsion, for example, JONCRYL 74, 89, 130, 537, and 538, all available from Johnson Diversey, Inc., and chlorinated polyethylenes and polypropylenes commercially available from Allied Chemical and Petrolite Corporation and Johnson Diversey, Inc. The polyethylene and polypropylene compositions may be selected from those illustrated in British Pat. No. 1,442,835, the entire disclosure of which is incorporated herein by reference.

The toners may contain the wax in any amount of from, for example, about 1 to about 25 wt % of the toner, such as from about 3 to about 15 wt % of the toner, on a dry basis; or from about 5 to about 20 wt % of the toner, or from about 5 to about 11 wt % of the toner.

Colorants

The toners may also contain at least one colorant. For example, colorants or pigments as used herein include pigment, dye, mixtures of pigment and dye, mixtures of pigments, mixtures of dyes, and the like. For simplicity, the teen "colorant" as used herein is meant to encompass such colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 wt % based upon the total weight of the composition, such as from about 1 to about 25 wt %.

In general, suitable colorants include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD Red (Aldrich), Lithol Rubine Toner (Paul Uhlrich), Lithol Scarlet 4440, NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF), and carbon blacks such as REGAL 330 (Cabot), Carbon Black 5250 and 5750 (Columbian Chemicals), and the like, and mixtures thereof Additional colorants include pigments in water-based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE GHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 600X and 9604X (Pigment Yellow 14 21095), FLEXIVERSE LFD 4343 and LFD 9736 (Pigment Black 7 77226), and the like, and mixtures thereof. Other water based colorant dispersions include those commercially available from Clariant, for example, HOSTAFINE Yellow GR, HOSTAFINE Black T and Black TS, HOSTAFINE Blue B2G, HOSTAFINE Rubine F6B, and magenta dry pigment such as Toner Magenta 6BVP2213 and Toner Magenta EO2 that may be dispersed in water and/or surfactant prior to use.

Other colorants include, for example, magnetites, such as Mobay magnetites MO8029, MO8960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMS-104; and the like, and mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Uhlrich & Company, Inc., PIGMENT VIOLET 1, PIGMENT RED 48, LEMON CHROME YELLOW DCC 1026, E. D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dimethyl substituted quinacridone and anthraquinone dye identified in the Color Index as CI-60710, CI Dispersed Red 15, diazo dye identified in the Color Index as CI 26050, CI Solvent Red 19, and the like, and mixtures thereof. Illustrative examples of cyans include copper tetra (octadecyl sulfonamide) phthalocyanine, x-copper phthalocyanine pigment listed in the Color Index as CI74160, CI Pigment Blue, and Anthrathrene Blue identified in the Color Index as DI 69810, Special Blue X-2137, and the like, and mixtures thereof. Illustrative examples of yellows that may be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICOBLACK and cyan components, may also be selected as pigments.

The colorant, such as carbon black, cyan, magenta, and/or yellow colorant, is incorporated in an amount sufficient to impart the desired color to the toner. In general, pigment or dye is employed in an amount ranging from about 1 to about 35 wt % of the toner particles on a solids basis, such as from about 5 to about 25 wt %, or from about 5 to about 15 wt %. However, amounts outside these ranges can also be used.

Coagulants

Coagulants used in emulsion aggregation processes for making toners include monovalent metal coagulants, divalent metal coagulants, polyion coagulants, and the like. As used herein, "polyion coagulant" refers to a coagulant that is a salt or an oxide, such as a metal salt or a metal oxide, formed from a metal species having a valence of at least 3, at least 4, or at least 5. Suitable coagulants include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds may have from about 2 to about 13, such as from about 3 to about 8, aluminum ions present in the compound.

The coagulants may be incorporated into the toner particles during particle aggregation. As such, the coagulant may be present in the toner particles, exclusive of external additives and on a dry weight basis, in amounts of from 0 to about 5 wt % of the toner particles, such as from about greater than 0 to about 3 wt % of the toner particles.

Emulsion Aggregation Procedures

Any suitable emulsion aggregation procedure may be used and modified in forming emulsion aggregation toner particles comprising the amorphous polyester resins disclosed herein, without restriction. These procedures typically include the basic process steps of mixing together an emulsion containing a polymer or a resin, optionally one or more waxes, optionally one or more colorants, optionally one or more surfactants, an optional coagulant, and one or more additional optional additives to form a slurry; heating the slurry to form aggregated particles in the shiny; freezing aggregation of the particles by adjusting the pH; and heating the aggregated particles in the slurry to coalesce the particles into toner particles; and then recovering, optionally washing, and optionally drying the obtained emulsion aggregation toner particles.

Emulsion Aggregation Toner Particles

The toner particles may have a circularity of about 0.920 to about 0.999, such as from about 0.940 to about 0.980, or from about 0.962 to about 0.980, or from about greater than or equal to 0.965 to about 0.990. A circularity of 1.000 indicates a completely circular sphere. Circularity may be measured with, for example, a Sysmex FPIA 2100 analyzer.

Emulsion aggregation processes provide greater control over the distribution of toner particle sizes and by limiting the amount of both fine and coarse toner particles in the toner. In some embodiments, the toner particles have a relatively narrow particle size distribution with a lower number ratio geometric standard deviation (GSDn) of about 1.15 to about 1.40, such as from about 1.15 to about 1.25, or from about 1.20 to about 1.35. The toner particles may also exhibit an upper geometric standard deviation by volume (GSDv) in the range of from about 1.15 to about 1.35, such as from about 1.15 to about 1.21, or from about 1.18 to about 1.30.

The toner particles may have a volume average diameter (also referred to as "volume average particle diameter" or "$D_{50v}$,") of from about 3 to about 25 µm, such as from about 4 to about 15 µm, or from about 5 to about 12 µm.

$D_{50v}$, GSDv, and GSDn may be determined using a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

The toner particles may have a shape factor of from about 105 to about 170, such as from about 110 to about 160, SF1*a. Scanning electron microscopy (SEM) may be used to determine the shape factor analysis of the toners by SEM and image analysis (IA). The average particle shapes are quantified by employing the following shape factor (SF1 *a) formula: SF1 *$a=100\pi d^2/(4A)$, where A is the area of the particle and d is its major axis. A perfectly circular or spherical particle has a shape factor of exactly 100. The shape factor SF1*a increases as the shape becomes more irregular or elongated in shape with a higher surface area.

The characteristics of the toner particles may be determined by any suitable technique and apparatus and are not limited to the instruments and techniques indicated hereinabove.

The toner particles may have a weight average molecular weight (Mw) in the range of from about 2,500 to about 60,000 daltons, a number average molecular weight (Mn) of from about 1,500 to about 18,000 daltons, and an MWD (a ratio of the Mw to Mn of the toner particles, a measure of the polydispersity, or width, of the polymer) of from about 1.7 to about 10. For cyan and yellow toners, the toner particles can exhibit an Mw of from about 2,500 to about 45,000 daltons, an Mn of from about 1,500 to about 15,000 daltons, and a MWD of from about 1.7 to about 10. For black and magenta, the toner particles can exhibit an Mw of from about 2,500 to about 45,000 daltons, an Mn of from about 1,500 to about 15,000 daltons, and an MWD of from about 1.7 to about 10.

Further, the toners if desired can have a specified relationship between the molecular weight of the latex binder and the molecular weight of the toner particles obtained following the emulsion aggregation procedure. As understood in the art, the binder undergoes crosslinking during processing, and the extent of crosslinking can be controlled during the process. The relationship can best be seen with respect to the molecular peak values (Mp) for the binder, which represents the highest peak of the Mw. In the present disclosure, the binder can have Mp values in the range of from about 5,000 to about 30,000 daltons, such as from about 7,500 to about 29,000 daltons. The toner particles prepared from the binder also exhibit a high molecular peak, for example, of from about 5,000 to about 32,000, such as from about 7,500 to about 31,500 daltons, indicating that the molecular peak is driven by the properties of the binder rather than another component such as the colorant.

Toners produced in accordance with the present disclosure may possess excellent charging characteristics when exposed to extreme relative humidity (RH) conditions. The low-humidity zone (C zone) may be about 12° C./15% RH, while the high humidity zone (A zone) may be about 28° C./85% RH. Toners of the present disclosure may possess a parent toner charge per mass ratio (Q/M) of from about −2 µC/g to about −50 µC/g, such as from about −4 µC/g to about −35 µC/g, and a final toner charging after surface additive blending of from −8 µC/g to about −40 µC/g, such as from about −10 µC/g to about −25 µC/g.

The toners may exhibit a heat cohesion at 54° C. of, for example, from about 0% to about 60%, such as from about 5% to about 20%, or from about 0% to about 10%, or at about 5%. The toners may exhibit a heat cohesion at 55° C. of, for example, from about 0% to about 80%, such as from about 5% to about 20%, or from about 0% to about 60%, or about 8%. The toners may exhibit a heat cohesion at 56° C. of, for example, from about 0% to about 90%, such as from about 5% to about 30%, or from about 0% to about 70%, or about 20%.

The toners may exhibit a cold offset temperature of, for example, from about 100° C. to about 140° C., such as from about 110° C. to about 130° C., or from about 115° C. to about 120° C.

The toner compositions may have a gloss, measured at the minimum fixing temperature (MFT), of from about 10 to about 50 gloss units, such as from about 20 to about 40 gloss units, or from about 25 to about 35 gloss units as measured on a BYK 75 degree micro gloss meter. "Gloss units" refers to Gardner Gloss Units (ggu) measured on plain paper (such as Xerox 90 gsm COLOR XPRESSIONS+paper or Xerox 4024 paper). The toners may reach 40 gloss units (TG40) at a temperature of, for example, from about 170° C. to about 210° C., such as from about 180° C. to about 200° C., or from about 185° C. to about 195° C. The toners may have a peak gloss of, for example, from about 40 ggu to about 75 ggu, such as from about 50 ggu to about 70 ggu, or from about 55 ggu to about 65 ggu.

Crease fix MFT is measured by folding images that have been fused over a wide range of fusing temperatures and then rolling a defined mass across the folded area. The print can also be folded using a commercially available folder such as the Duplo D-590 paper folder. The sheets of paper are then unfolded and toner that has been fractured from the sheet of paper is wiped from the surface. Comparison of the fractured area is then made to an internal reference chart. Smaller fractured areas indicate better toner adhesion and the temperature required to achieve acceptable adhesion is defined as the crease fix MFT. The toner compositions may have a crease fix MFT of, for example, from about 115° C. to about 145° C., such as from about 120° C. to about 140° C., or from about 125° C. to about 135° C.

EXAMPLES

Example I

A 1-liter volume, Pan Bench Top Reactor, was fitted with a short path condenser, nitrogen inlet, and magnetic stir shaft, connected to a controller. The vessel was charged with 292.28 g isosorbide (IS), 236.18 g succinic acid (SA) and 0.528 g Fascat 4201 (dibutyltin oxide). The vessel and contents were purged with nitrogen, and an aluminum block surrounding vessel was heated so that the contents of the vessel reached 150° C. over 50 minutes. By the time the temperature of the vessel reached 180° C., polycondensation of the reactant diol and diacid had begun. Approximately 44 ml of distillate was collected on Day 1. The vessel was left to heat over night at 190° C.

On Day 2, the temperature was increased to 220° C. and the total distillate collected reached almost 50 ml. The vacuum receiver was attached to the vacuum pump via a hose and the pressure in the reaction vessel was lowered from atmospheric pressure to 0.09 Torr over a period of 6 hours while collecting additional distillate. The reaction continued over the 6 hours under vacuum to increase molecular weight as checked by the softening point value measured via propping Point Cell (Mettler FP90 central processor with a Mettler FP83HT dropping point cell). Once the appropriate softening point was reached, the reaction was terminated by achieving atmospheric pressure again and discharging the polymer into an aluminum pan.

After the polymer resin cooled to room temperature, the polymer was broken into small chunks with a chisel and a small portion was ground in a M20 IKA Werke mill. The ground polymer was analyzed for molecular weight by gel permeation chromatography (GPC), glass transition temperature (Tg) by differential scanning calorimetry (DSC), and viscosity by SR-5000 Rheometric Scientific rheometer. The acid value (or "neutralization number" or "acid number" or "acidity") was measured by dissolving a known amount of polymer sample in organic solvent and titrating with a solution of potassium hydroxide with known concentration and with phenolphthalein as a color indicator. Acid number is the mass of potassium hydroxide (KOH) in milligrams that is required to neutralize one gram of chemical substance. In this case, the acid number was the measure of the amount of carboxylic acid groups in the polyester molecule.

Example II

A 1-liter volume, Parr Bench Top Reactor, was fitted with a short path condenser, nitrogen inlet, and magnetic stir shaft, connected to a controller. The vessel was charged with 328.82 g isosorbide (IS), 225.85 g succinic acid (SA), 84.70 g azelaic acid (AzA), and 0.639 g Fascat 4201 (dibutyltin oxide). The vessel and contents were purged with nitrogen, and an aluminum block surrounding vessel was heated so that the contents of the vessel reached 150° C. over 50 minutes. By the time the temperature of the vessel reached 180° C., polycondensation of the reactant diol and diacid had begun. Approximately 55 ml of distillate was collected on Day 1. The vessel was left to heat over night at 190° C.

On Day 2, the temperature was increased to 220° C. and the total distillate collected reached almost 65 ml. The vacuum receiver was attached to the vacuum pump via a hose and the pressure in the reaction vessel was lowered from atmospheric pressure to 0.09 Torr over a period of 6 hours while collecting additional distillate. The reaction continued over the 6 hours under vacuum to increase molecular weight as checked by the softening point value measured via Dropping Point Cell (Mettler FP90 central processor with a Mettler FP83HT dropping point cell). Once the appropriate softening point was reached, the reaction was terminated by achieving atmospheric pressure again and discharging the polymer into an aluminum pan.

After the polymer resin cooled to room temperature, the polymer was broken into small chunks with a chisel and a small portion was ground in a M20 IKA Werke mill. The ground polymer sample was analyzed via GPC, DSC, rheometry, and acid value.

Examples III-V

The polymers of Examples III to V were made in essentially the same manner as Example II, except for the amounts of isosorbide, succinic acid, and azelaic acid added to the reaction mixtures. Table 1 lists the ratios (mole/eq) of each monomer used.

Various resin designs have been reduced to practice, as seen in Table 1. By changing the molar concentrations of each of the three monomers, a variety of polymer compositions and properties can be achieved. For instance, by adding more azelaic acid relative to succinic acid in the polymer formulation, a decrease in glass transition temperature will result. The polymer formulation can be tailored to produce toners of different gloss levels. For instance, lower softening point (Ts) resins of 101-103° C. will result in toners of higher gloss than resins with Ts of 105° C. or higher.

TABLE 1

Co- and Terpolymers of Isosorbide with Succinic Acid and Azelaic Acid.

| Ex. | Monomers (mole/eq) | | | $Tg_{(on)}$ (° C.) | Ts (° C.) | Acid# mgKOH/g | GPC | |
|---|---|---|---|---|---|---|---|---|
| | SA | IS | AzA | | | | Mw | Mn |
| I | 0.50 | 0.50 | n/a | 66.4 | 105.1 | 14.1 | 3800 | 2400 |
| II | 0.425 | 0.50 | 0.10 | 52.8 | 105.5 | 6.4 | 11500 | 4700 |
| III | 0.385 | 0.50 | 0.15 | 41.9 | 102.7 | 19.4 | 11002 | 4160 |
| IV | 0.45 | 0.50 | 0.05 | 50.6 | 101.7 | 17.7 | 4699 | 2601 |
| V | 0.45 | 0.50 | 0.05 | 59.8 | 106.0 | 4.1 | 7444 | 4092 |

Example VI

A toner was made with the resin of Example II, as described below.

Emulsification of Bio-Based Resin of Example II 112.96 g of the resin of Example II was measured into a 2-liter beaker containing about 1129.6 g of dichloromethane. The mixture was stirred at about 300 rpm at room temperature to dissolve the resin in the dichloromethane. 1.05 g of sodium bicarbonate and 4.83 g of DOWFAX (46.75 wt %) were measured into a 3-liter Pyrex glass flask reactor containing about 700 g of deionized water. The water solution in the 4-liter glass flask reactor was homogenized with an IKA Ultra Turrax T50 homogenizer at 4,000 rpm. The resin solution was then slowly poured into the water solution as the mixture continued to be homogenized, while the homogenizer speed was increased to 8,000 rpm and homogenization was carried out at these conditions for about 30 minutes. Upon completion of the homogenization, the glass flask reactor and its contents were placed in a heating mantle and connected to a distillation device. The mixture was stirred at about 200 rpm and the temperature of the mixture was increased to 50° C. at about 1° C. per minute to distill off the dichloromethane from the mixture. Stirring was continued at 50° C. for about 180 minutes followed by cooling at about 2° C. per minute to room temperature. The product was screened through a 25 µm sieve. The resulting resin emulsion was comprised of about 20.80% by weight solids in water, with an average particle size of 199.8 nm.

Preparation of Ea Toner

Into a 2-liter beaker was added 517.85 g of the emulsion containing the bio-based resin of Example II and 48 g of an unsaturated CPE resin emulsion (UCPE, 30 wt %). 59.74 g of $Al_2(SO_4)_3$ solution (1 wt %) was added as a flocculent under homogenization. The mixture was subsequently transferred to a 2-liter Buchi and heated to 23.2° C. for aggregation at 500 rpm. The volume average particle size was 8.68 µm with a GSD of 1.32, measured by a Coulter Counter. Thereafter, the pH of the reaction slurry was then increased to 8.39 using NaOH (4 wt %) to freeze the toner growth. After freezing, the reaction mixture was heated to 59.2° C., and the pH was reduced to 7.59 for coalescence. The toner was quenched after coalescence, and it had a final particle size of 9.95 µm, a GSD of 1.26, and a circularity of 0.949. The toner slurry was then separated from any coarse particles by sieving (25 µm), filtrated, followed by washing and freeze drying.

Determining the Electrostatic Charge

The following method was used to determine the electrostatic charge on the toner. To prepare a developer, 99% of an iron powder having particle sizes of from 75 to 175 with a medium particle size of 120 μm, and a spherical particle shape was accurately weighed out together with 1% of the toner, and the mixture was activated for 10 minutes on a roll mill. Thereafter, the electrostatic charge on the developer was determined. About 5 g of the activated developer was introduced into a commercial q/m meter (from Epping GmbH, Neufahrn) into a hard blow off cell electrically connected to an electrometer. The mesh size of the sieves used in the measuring cell was 50 μm. This ensures that virtually all the toner is blown off, while the carrier remains in the measuring cell. A fast stream of air (about 4000 $cm^3$/min) and simultaneous aspiration was used to remove virtually all the toner from the carrier particles, the latter remaining in the measuring cell. An electrometer indicated the amount of the charge on the carrier, which corresponds to the amount of charge on the toner particles, only under the opposite sign. To calculate the q/m value, the absolute amount of q is used with the opposite sign. The measuring cell was weighed back to determine the weight of blown off toner, and the weight was used to calculate the electrostatic charge q/m. The charging results (q/m) were 12 for A-zone (28° C./85% RH) and 34 for C-zone (10° C./15% RH).

Determining the Heat Cohesion

The following method was used to determine heat cohesion of the toner. 5 g of toner were placed into an open dish and conditioned in an environmental chamber at 54° C. and 50% RH. After 24 hours, the samples were removed and acclimated in ambient conditions for 30 minutes. The re-acclimated sample was then poured into a stack of two pre-weighed mesh sieves, which were stacked with 1,000 μm on top and 106 μm on bottom. The sieves were vibrated for 90 seconds at 1 mm amplitude with a Hosokawa flow tester. After the vibration was completed, the sieves were reweighed and the toner heat cohesion was calculated from the total amount of toner remaining on both sieves as a percentage of the starting weight. Heat cohesion of this toner was measured to be only 5% at 54° C. and 8% at 55° C.

Other Properties

The onset glass transition temperature of the toner was measured to be 52.6° C. using a DuPont differential scanning calorimeter (DSC) with a temperature ramp of 10° C./min.

EA particles were blended with EA HG additive package at 13,000 rpm for 30 seconds. Unfused images were made using a modified DC 12 printer (S/N=FU0-025042) and imaged onto 90 gsm CX+(Color Xpressions+) uncoated paper at ~0.50 mg/$cm^2$ as well as 120 gsm DCEG (Digital Color Elite Gloss) coated paper. A slightly higher than nominal (0.48 mg/$cm^2$) toner mass area (TMA) was used to obtain a more uniform image quality. The developer charge is 35 grams of toner and 365 grams of Dnieper carrier. Environmental conditions during fusing were TAPPI room ambient (~24° C. and ~50% R.H.), The target image used for gloss, crease, and hot offset was a square, 6.35 cm by 6.35 cm, and was positioned near the centre of the page. Thirty sheets of 75 gsm 4200 paper were sent through a fuser to stabilize oil rate and fuser roll temperature. Immediately after the thirty sheets were run, two unfused images were then placed on the transport belt and sent through the fuser. The fuser roll process speed was 468 mm/s (100 PPM) and the fuser roll nip width was ~14.0 mm/s, which gave a nominal 30 ms dwell.

On CX+ paper, a control toner (iGen3 cyan toner) started to cold offset (CO) at 149° C., which is consistent with previous results. The experimental toner cold offset at 114° C.

On uncoated CX+ paper, the experimental toner reached 40 gloss units (TG40) at 188° C., and the peak gloss for the toner was 54 ggu. On DCEG paper, the experimental toner reached 40 gloss units (TG40) at 181° C., and the peak gloss for the toner was 40 ggu.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of making an amorphous polyester resin, the method comprising:
   synthesizing isosorbide from D-glucose;
   obtaining a mixture comprising a succinic acid obtained by a submerged culture anaerobic fermentation process, and an azelaic acid produced by oxidative cleavage of oleic acid with chromic acid or by ozonolysis; and
   polycondensing the isosorbide synthesized from D-glucose with the mixture of succinic acid and azelaic acid in the presence of a catalyst to obtain the amorphous polyester resin;
   wherein:
   the ratio of isosorbide to the mixture of succinic acid and azelaic acid in the polyester resin is from about 40:60 to about 60:40 mol % of the polyester resin;
   the succinic acid is present in an amount of from about 30 to about 60 mol % of the polyester resin;
   the azelaic acid is present in an amount of from about 5 to about 20 mol % of the polyester resin; and
   a total amount of succinic acid and azelaic acid present in the polyester resin is from about 40 to 60 mol %.

2. The method of claim 1, wherein the polyester resin has a glass transition temperature of from about 30° C. to about 120° C.

3. The method of claim 1, wherein the polyester resin has a softening point temperature of from about 90° C. to about 150° C.

4. The method of claim 1, wherein the polyester resin has an acid value from about 2 to about 30 mgKOH/g.

5. A method of forming toner particles, the method comprising:
   forming a slurry by mixing together:
      an emulsion containing an amorphous polyester resin obtained from a method comprising:
         synthesizing isosorbide from D-glucose;
         obtaining a mixture comprising a succinic acid obtained by a submerged culture anaerobic fermentation process, and an azelaic acid produced by oxidative cleavage of oleic acid with chromic acid or by ozonolysis; and
         polycondensing the isosorbide synthesized from D-glucose with the mixture of succinic acid and azelaic acid in the presence of a catalyst to obtain the amorphous polyester resin;
      optionally a wax;
      optionally a colorant;
      optionally a surfactant;
      optional a coagulant; and
      one or more additional optional additives;
   heating the slurry to form aggregated particles in the slurry;
   freezing aggregation of the particles by adjusting the pH; and heating the aggregated particles in the slurry to coalesce the particles into toner particles;

wherein:

the ratio of isosorbide to the mixture of succinic acid and azelaic acid in the polyester resin is from about 40:60 to about 60:40 mol % of the polyester resin;

the succinic acid is present in an amount of from about 30 to about 60 mol % of the polyester resin;

the azelaic acid is present in an amount of from about 5 to about 20 mol % of the polyester resin; and a total amount of succinic acid and azelaic acid present in the polyester resin is from about 40 to 60 mol %.

6. The method of claim 5, wherein the polyester resin has a glass transition temperature of from about 45° C. to about 75° C.

7. The method of claim 5, wherein the polyester resin has a softening point temperature of from about 95° C. to about 125° C.

8. The method of claim 5, wherein the polyester resin has an acid value from about 5 to about 30 mgKOH/g.

9. The method of claim 5, wherein the toner particles have a circularity of from about 0.920 to about 0.999.

10. The method of claim 5, wherein the toner particles have a volume average diameter of from about 3 to about 25 μm.

* * * * *